United States Patent [19]

Milan

[11] Patent Number: 4,694,298
[45] Date of Patent: Sep. 15, 1987

[54] ADAPTIVE, FAULT-TOLERANT NARROWBAND FILTERBANK

[75] Inventor: John M. Milan, Canoga Park, Calif.

[73] Assignee: ITT Gilfillan, Van Nuys, Calif.

[21] Appl. No.: 548,607

[22] Filed: Nov. 4, 1983

[51] Int. Cl.⁴ ............................................. G01S 7/40
[52] U.S. Cl. .................................... 342/89; 342/162;
342/169; 342/194; 364/724
[58] Field of Search .............. 343/5 DP, 5 FT, 5 NQ,
343/7.7; 364/724, 825; 342/159-164, 175, 194,
195, 165, 169-171, 173, 174, 175, 89, 91

[56] References Cited

U.S. PATENT DOCUMENTS

| | | | |
|---|---|---|---|
| 4,093,989 | 6/1978 | Flink et al. | 364/724 |
| 4,375,640 | 3/1983 | Harvey | 343/7.7 |
| 4,536,764 | 8/1985 | Freeman | 343/5 DP |

FOREIGN PATENT DOCUMENTS 2616770 10/1977 Fed. Rep. of Germany .

OTHER PUBLICATIONS

IEEE Transactions on Acoustics, Speech & Signal Proceedings, vol. ASSP-29, No. 3, Jun. 1981, part III, pp. 679-683.
1980 IEEE International Symposium on Circuits and Systems Proceedings, Houston, Texas, 28th-30th Apr. 1980, pp. 142-146.
Frequenz, vol. 30, No. 9, Sep. 1976, pp. 238-243.
International Conference Radar-82, London, GB, 18th-20th Oct. '82, pp. 496-500, Y. H. Gong et al.

Primary Examiner—T. H. Tubbesing
Assistant Examiner—Bernarr E. Gregory
Attorney, Agent, or Firm—Robert A. Walsh; Mary C. Werner

[57] ABSTRACT

An adaptive, fail-soft digital filterbank for digitized Doppler-modulated video signals. A plurality of modules are controlled by the impulse filter weighting technique to each respond to a set of discrete Doppler frequencies. A built-in test feature is included, the module inputs being multiplexed between system digitized video and synthetic signals to continuously confirm proper operation. Module failures are recognized by the control (programming) circuitry and spare modules can be activated. Control and communications link circuitry is constructed with multiple redundancy.

15 Claims, 4 Drawing Figures

$$y = \sum_{i=1}^{N}(A+jB)(I+jQ)$$
$$= \sum_{i=1}^{N}(AI-BQ)+j(BI+AQ)$$

$$y = \sum_{i=1}^{N} W_i V_i$$
$$V_i = I+jQ$$
$$W_i = A+jB$$

ADAPTIVE, FAULT-TOLERANT NARROWBAND FILTERBANK

The government of the United States has rights in this invention pursuant to Contract F30602-78-C-0288 awarded by the Department of the Air Force.

BACKGROUND OF THE INVENTION

Modern radar systems rely heavily on digital processing techniques for improved performance in the accomplishment of certain functions which are unduly difficult or even impossible using purely analog techniques.

The invention applies in particular to radar systems such as so-called Doppler MTI systems in digital form where it is desired to accept only moving targets or to separate echo signals received in response to pulse transmissions on the basis of the Doppler modulation thereon.

Digital MTI radar systems per se are well known in the art and have been extensively described in the patent and other technical literatures. The text *Radar Handbook* by Merrill I. Skolnik (McGraw Hill Book Company, 1970) describes this background knowledge particularly in Chapter 17 thereof. The so-called bipolar video output modulated by the aforementioned Doppler frequency component will be seen in FIG. 6 presented in the aforementioned Chapter 17 of the Skolnik text. The change in path length between the radar equipment and the moving reflecting object produces a phase change from pulse to pulse, the rate of this change being a function of the Doppler frequency which, in turn, is directly related to the radial velocity of the reflecting object with respect to the radar equipment. The term "bipolar" is used to indicate that the coherent video pulses corresponding to successive transmitted pulses vary at the Doppler rate between a nominal maximum positive value and a nominal maximum negative value, the rate of that variation being directly attributable to the Doppler modulation component aforementioned.

Whatever means of angular beam scan are employed, it is normal to have a number of "hits" on the object or target of interest, those hits each corresponding to a positive or negative amplitude in the corresponding bipolar video signal within the maximum positive and negative amplitude limits. The number of hits is the number processed as a batch by the filter.

In a digital system of the type to which the present invention applies, the value within the bipolar video is encoded digitally, that is, a discrete digital number is generated representative of its instantaneous peak amplitude. The aforementioned process for generating digital coherent video signals is of itself well known and is extensively described in the patent and other technical literatures. For example, U.S. Pat. No. 3,406,396 includes a description of the aforementioned encoding process of a complex video signal. The term "complex video," is as understood in this art, viz., two signals called I and Q components (real and imaginary terms) result from coherent detection against zero phase and 90° phase coherent oscillator references. It is complex video signals of this type to which the combination of the present invention is intended to respond.

In a purely analog arrangement, so-called "comb" filters have been employed to separate received echo signals on the basis of their Doppler modulation and, therefore, of their corresponding radial velocities. Such filters and variations thereof can be understood as background information, also from the patent and other technical literature; for example, the text *Modern Radar* by Raymond S. Berkowitz (John Wiley and Sons, 1965, Third Printing 1967, and further identified by Library of Congress Card No. 65-21446). Chapter 2 of that text entitled "MTI Radar Filters" is of particular interest in connection with the background of MTI and pulse Doppler radar system filters.

Of more immediate interest as prior art, it will be noted that digital narrowband filterbanks have been constructed, and these have provided significant processing improvement over wider band filters because of coherent gain (favorable S/N) and independent control of the individual filters. Such prior filterbank arrangements may employ fast Fourier transform (FFT) and optimum filter (OF) techniques. These existing digital filterbanks usually employ a plurality of fixed digital filters, each of those filter modules responding to a set of discrete Doppler frequencies within the expected range of frequencies. Obviously, the narrower the frequency response of these individual filter modules, the more of them are required. A compromise in favor of somewhat wider Doppler filter bandwidths reduces the numerical requirement for filter modules, but also reduces the signal processing gain and the accuracy of target velocity determination. Still further, a fixed or non-adaptive filter module produces a non-fault-tolerant arrangement in which a filter response may be totally absent for one or more discrete Doppler frequencies. Moreover, whatever controlling circuitry is employed, introduces an additional element of failure susceptibility.

The manner in which the present invention deals with the prior art disadvantages to provide a new adaptive, fault-tolerant narrowband filterbank will be understood as this description proceeds.

SUMMARY OF THE INVENTION

In response to the disadvantages of existing filterbanks as hereinbefore set forth, the invention adds key improvements including frequency adaptability of the filter modules such that they can be controlled to any of the narrow passbands prescribed, and built-in redundancy in the controller circuitry which dictates the frequency response of the individual filter modules. Spare modules may thus be automatically programmed into operation should a fault develop within one or more of the active modules at any time. The built-in redundancy in the controller circuitry also extends to the communication link extant between itself and the individual filter modules.

The adaptive, fault-tolerant narrowband filterbank according to the invention comprises four major parts. These are the filter modules themselves, the controller circuitry (STATE processor), an output multiplexer, and a communications bus. The STATE processor is hereinafter also referred to as the "controller," the term "STATE" referring to status, transformation and test evaluation. High controller reliability is obtained by active redundancy in a triple modular redundant design using microprocessors.

In the embodiment of the invention which will be described in detail hereinafter, a plurality of filter modules responsive in parallel to a complex video input provide their individual Doppler signal outputs to an output multiplexer. This output multiplexer responds to a controller signal so that each of the bipolar digital complex video outputs of the active filter modules is assigned a time slot consistent with the corresponding target range and a unique scan angle to provide a digitized signal train in characteristic MTI video format. In addition, since batch processing is utilized, these outputs can later be further processed as individual filters.

The individual filter modules are "tunable" in response to a programmed-in weighting of digital values to influence the Doppler frequency response of a given module. As previously indicated, the bipolar video corresponding to the group of hits contains the Doppler frequency as a modulation. This modulation has an inherent spectrum peaked at a Doppler frequency fundamentally representative of target velocity. Accordingly, when a target returning this modulation spectrum falls within the spectrum of a filter module in use at any given time, it does not respond to any signal of different Doppler modulation within the pulse repetition period of the overall radar system.

The concepts of digital filtering are of themselves known in this art, such as in connection with FFT (Fast Fourier Transform) MTI filters. Generically, each filter module is a finite impulse response filter (FIR) whose shape is determined by a set of weighting coefficients stored in a PROM unit in each such filter. The selection of the applicable predetermined weighting coefficient is performed in accordance with instructions from the controller. Thus, the filter modules are each adapted to a discrete Doppler signal environment, it being anticipated that a larger number of filter modules are provided than are expected to be employed adaptively, the extra modules being available for programming into use when the built-in test feature provided by the controller indicates a fault or malfunction in a given module.

The controller itself makes use of several unique circuit approaches in order to obtain high (hard-wire) reliability. There is active redundancy provided through the triple-modular redundancy controller design using microprocessors. The controller itself is adaptive (programmable). The applications program stored in on-board PROMs in the controller contains the BIT (built-in test) data which is sent to the filter modules to determine their condition. The details of operation of typical circuits for instrumenting the concepts of the invention will be understood as this description proceeds.

DETAILED DESCRIPTION

Figure 1:
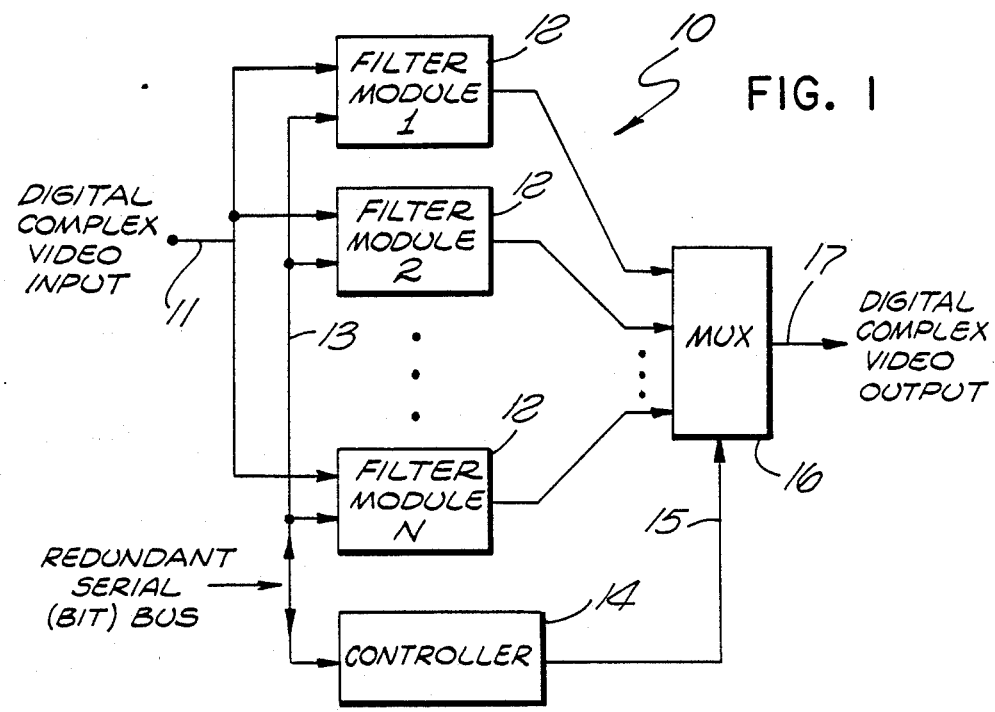
FIG. 1 is an overall block diagram of the adaptive, fault-tolerant narrowband filterbank invention.

Referring to FIG. 1, a simplified block diagram of the adaptive, fault-tolerant narrowband filterbank system 10 according to the present invention is shown. That system comprises major components as follows: The filter modules 12 (N in number) responsive to the complex I and Q radar video input 11, the controller 14, and an output multiplexor 16. The controller 14 provides the necessary gating and timing functions which will be understood as this description proceeds, and also implements the BIT (built-in test) function on the BIT or communications bus 13. The BIT bus 13 is preferably a serial bus. In this way, redundancy is much more easily provided and the total "hard-wired" requirements are greatly reduced.

Since the digital complex video input 11 feeds all the filter modules 12 in parallel, one function of the controller 14 is to provide Doppler frequency selection control applicable to input video data on 11 and test signals on 13. This selection is by way of a set of discrete weighting signals applied within each filter module, effectively tuning that module to a corresponding signal Doppler frequency. The controller 14 provides timing multiplex control whereby each of the individual filter modules 12 responds alternately to I and Q video data and test signals (simulated video) inputs from the controller for continuously testing module responses for correspondence with the instructions given to select the set of weights transmitted along with those test signals on bus 13. As previously indicated, each of the filter modules 12 is capable of being programmed for any response (Doppler modulation) within the design range. Multiplexer control line 15 provides control after the filters are selected to put them in the proper order for processing. The multiplexer 16 serves to provide the time-multiplexed digital complex video outputs of all modules on lead 17 in accordance with time sharing control from controller 14 on bus 13.

Figure 2:
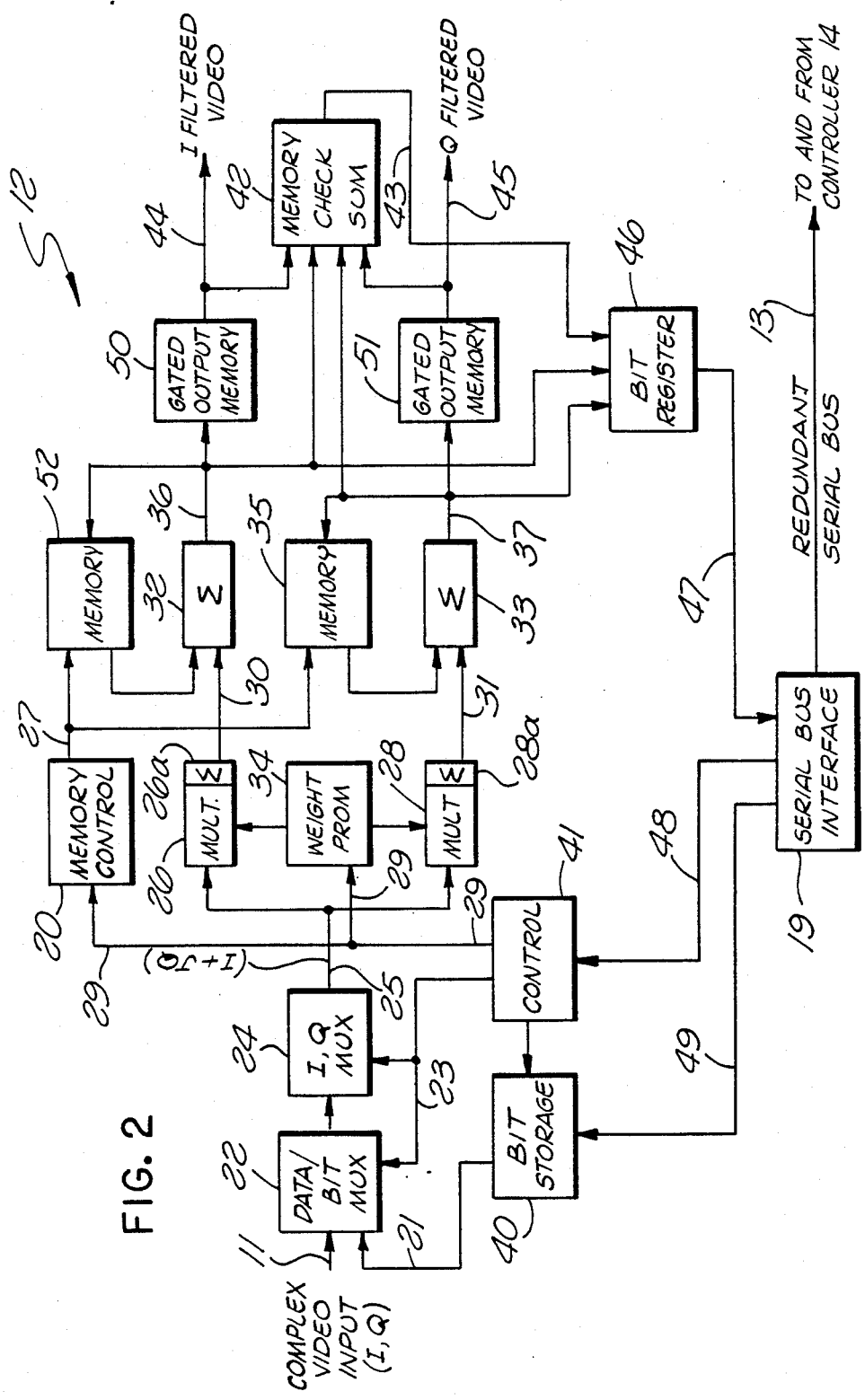
FIG. 2 is a detailed circuit block diagram of each filter module within the arrangement of FIG. 1.

Referring now to FIG. 2, which is a schematic block diagram of each of the identical filter modules 12 depicted in FIG. 1, the filter operation will be explained with reference to FIGS. 3 and 4, as necessary.

In the drawings and this description, the conventional clock pulse generator and its associated circuits have been omitted, however, it is understood by those of skill in this art that clock pulse generation and application to the circuitry is required, consistent with the nature of the individual blocks and their functions.

The narrowband filter bank combination is configured from the sum of the individual filter modules 12 under the test, selection and control of the STATE processor, the "STATE" processor (Status, Transformation and Test Evaluation) being also referred to hereinafter as the "controller."

More filter modules are available initially than needed in the filterbank to provide redundancy, and it will be seen as this description proceeds how these spare modules are substituted for failed modules.

Each of the modules 12 is a general FIR (Finite Impulse Response) filter, the frequency response or shape of which is determined by a set of weighting coefficients stored in a PROM 34. The coefficients stored in PROM 34 are determined a priori and are selected by the controller 14 in accordance with selection control signals which are a part of the information transmitted on the redundant serial bus 13.

At the input 11, complex video input comprising I and Q signals conventionally digitized from coherent received video data in a radar system is applied at 11 to a data/BIT multiplexer 22. Also inputted to the multiplexer 22 is a signal on lead 21 which is, in effect, a synthetic test signal comprising I and Q components short-time stored within the storage unit 40 identified as BIT storage. The term "BIT" refers to "built-in test" and the relevance of that term will be understood as this description proceeds.

Figure 3:
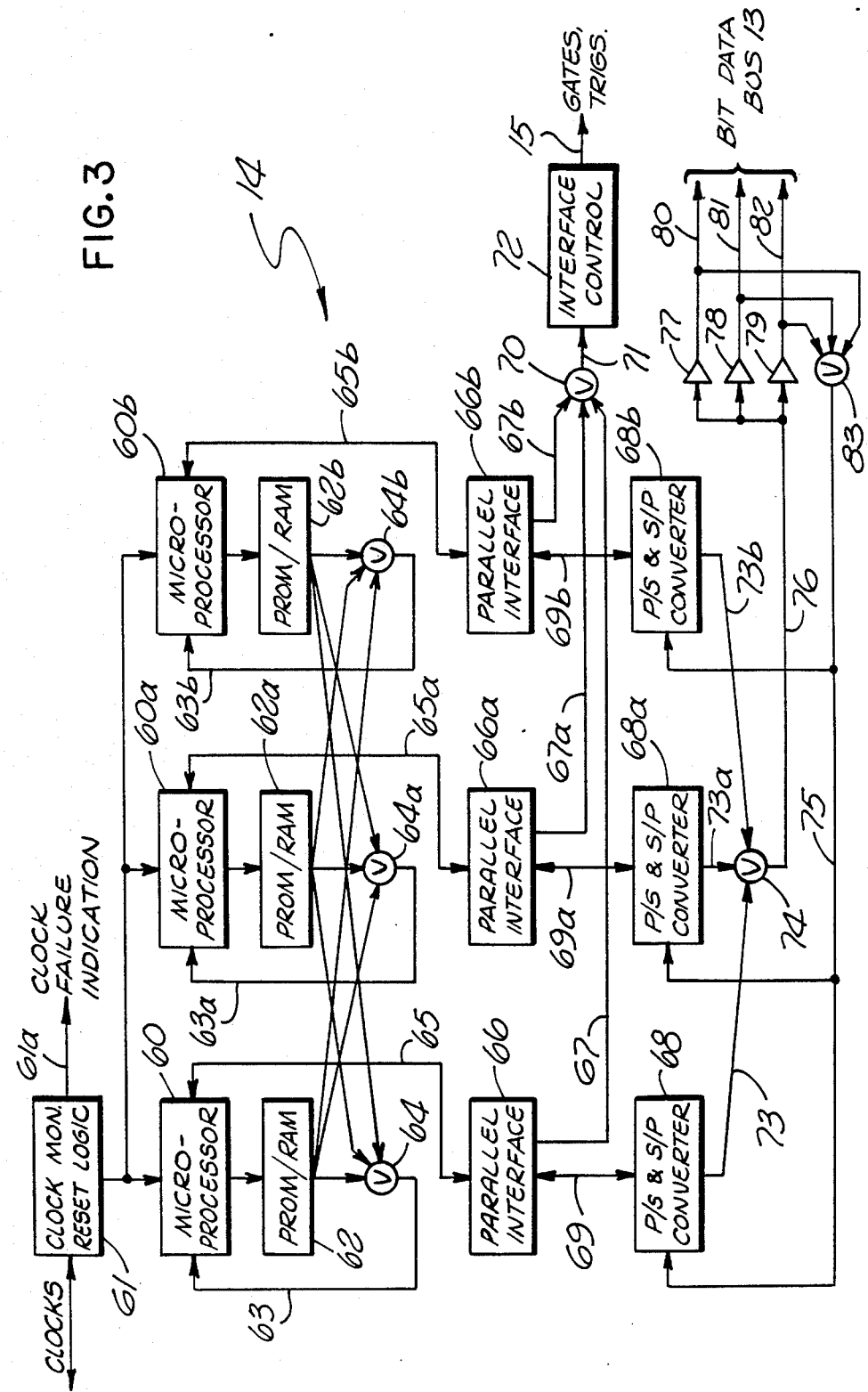
FIG. 3 is circuit block diagram of the controller illustrated in FIG. 1.

The redundant serial bus 13 actually comprises more than one conductor, for example, 80, 81 and 82 as shown on FIG. 3. At this point it is useful to consider the nature of the signals on redundant serial bus 13, it being realized that the signals on 80, 81 and 82 which constitute the bus 13 are combined within a serial bus interface unit 19, for example, by use of a two out of three AND circuit. The redundant serial bus 13 is operative in two signal directions between the filter modules and the controller 14. Basically, three types of information are extant on serial bus 13. These include discretely addressed control signals recognized by block 41 in accordance with the data on lead 48 from the serial bus interface 19. Also present are the simulated or synthetic signal for test purposes (complete with Doppler modulation at the Doppler frequency to which the particular module is intended to respond) on lead 49 to the BIT storage unit 40. Discretely addressed control signals (in digital form, of course) on lead 29 are applied to the weight PROM 34 and to memory control unit 20. There are also return signals from BITE register 46 via lead 47 to serial bus interface 19 which are passed back via serial bus 13 to controller 14. This latter function will be described subsequently.

It is the function of the control signal on 23 to time-multiplex in unit 22 between the actual digital video of the system on lead 11 and the test (synthetic) digital video on lead 21. In this way there is continuous checking of the operability of the module so that a failed module is immediately detected in a manner which will be clear as this description proceeds.

The process of applying the weights from the PROM 34 to the digital video signals, both the actual signals and the BITE video as aforementioned, requires the implementation of the mathematical relationships as follows:

$$y = \sum_{i=1}^{i=N} W_i V_i$$

where $V_i$ is the instantaneous digital video complex amplitude at sample time $i$ and $W_i$ is the corresponding digital weighting value $V_i = I + jQ$ (for actual and test complex video)

$W_i = A + jB$ (complex weighting value)

accordingly, $$y = \sum_{i=1}^{N} (A + jB)(I + jQ).$$

and four separate multiplications would be required to simultaneously perform the complex multiplication of $(A+jB)(I+jQ)$. An equivalent result is obtained in the arrangement of FIG. 2 by multiplexing the I and Q terms of the complex video to multiply them by the complex weighting terms on successive clock pulses. Thus, only two multipliers 26 and 28 are required, the contemporaneous weighting values being provided by PROM 34, for example, with the real term of the weighting to multiplier 26 and the imaginary weighting term to multiplier 28. Thus on a given clock, multiplier 26 multiplies (A)(I) and 28 multiplies (B)(I). On the next clock, 26 multiplies (B)(Q) and 28 produces (A)(Q). The non-real-time penalty resulting from multiplexing in block 24 is not important, since the ultimate determinations are related to Doppler modulation frequencies which are very low compared to even the slowest of conventional digital computing operations.

A summer 26a sums the relationship $AI-BQ$ so that output lead 30 is that sum. Similarly, summer 28a produces the algebraic sum of $BI+AQ$ and output 31 is that algebraic sum. These values present on leads 30 and 31 are essentially single hit data and the purpose of memories 52, 35 and their respective summers 32 and 33 is to evaluate those algebraic sums over the sum of hits N for the target exhibiting the Doppler velocity (Doppler modulation) to which the particular module 12 is constrained to respond. Memory control unit 20 receives control signals on lead 29 from control unit 41 (which had previously been separated from the serial bus 13 data flowing from the controller 14). That arrangement requires the memories and summers 52, 32, 35 and 33 to perform their summing functions at a time synchronized with the functions of the weight PROM 34 although at a later clock.

Output leads 36 and 37, the "sum of hits" values, are provided to gated output memories 50 and 51 so that the net output I and Q filtered video values are on leads 44 and 45, respectively. The gating of memories 50 and 51 is accomplished in accordance with output 15 from the interface control unit 72 of the controller (FIG. 3), and serves to limit the I and Q output signals on leads 44 and 45, respectively, to the time of operation of the given module 12 to the exclusion of the times of operation of the other modules 12 in the overall system.

The function of the memory sum checker 42 is to compare the values on leads 44 and 45 with those on leads 36 and 37 to assure against malfunctions. An output lead 43 from unit 42 is supplied to the BIT (built-in test) register 46, and this confirmation signal becomes part of the data transmitted by lead 47 back through the serial bus interface unit 19 to the controller 14 via the serial bus 13. This confirms to the controller that the output portion of the module 12 is functioning properly. Leads 36 and 37 contribute their outputs to BIT register 46, this information also finding its way via lead 47 and the serial bus 13 back to the controller for conparison of the actual Doppler response to that intended for the particular module 12.

It should be mentioned that the feedback of leads 36 and 37 to memory units 52 and 35 through summers 32 and 33, respectively, effects the required integration of signals on 36 and 37.

Figure 4:
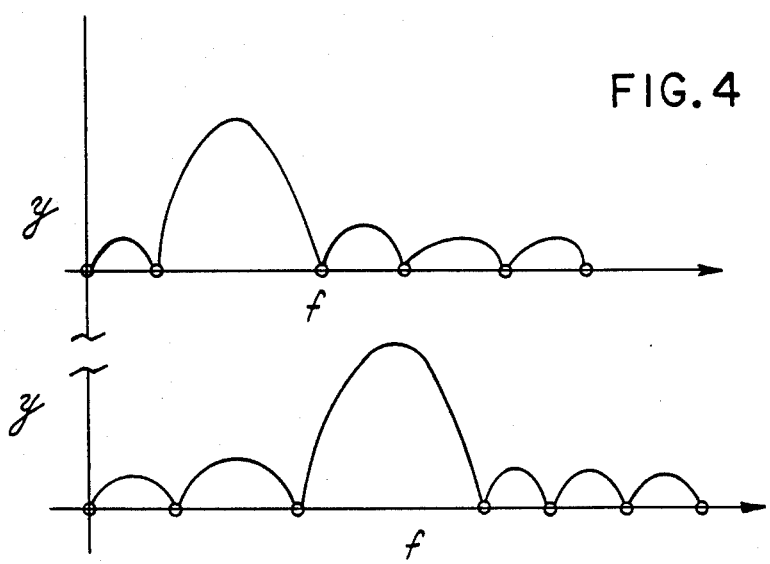
FIG. 4 is a typical filter module amplitude response for a pair of separately tuned filter modules of FIG. 1.

FIG. 4 illustrates the response of two differently tuned modules in accordance with the aforementioned mathematical relationships relating to the weighting format.

FIG. 3, as previously indicated, depicts the controller or STATE processor as previously mentioned. System clocks are applied to a clock monitor and reset logic unit 61 which performs hardware checking of these critical signals as part of the Built-In-Test features. A clock failure indication is produced on lead 61a when clocks are lost.

A plurality of redundant computing arrangements (three in number) are illustrated throughout FIG. 3. This provides basic redundancy in order that the system as a whole can be "fail soft."

The nerve center of this programmer is embodied in microprocessor 60 and PROM/RAM 62. The second redundant microprocessor and PROM/RAM combinations 60a and 62a as well as the third redundant units 60b and 62b operate essentially in parallel and function identically. Thus for the example of FIG. 3 there will be seen to be three redundant channels. Multiple input VOTER (2 out of 3 AND) circuits 64, 64a and 64b are all cross-connected as shown, so that their outputs reflect the majority vote of the pulse coincident signals produced by the parallel redundant operation. Thus proper operation continues even upon loss of one parallel channel.

The components of FIG. 3 just mentioned operate in parallel digital form, however as previously indicated, the BIT data bus 13 is a serial bus since far fewer conductors are required to effect redundancy in such a bus. In the example shown, conductors 80, 81 and 82 comprise the BIT data bus 13. Parallel interface blocks 66, 66a and 66b act as buffers feeding parallel data to the parallel-to-serial and serial-to-parallel converters 68, 68a and 68b. Those circuits are two-way interface and converter circuits whose outputs in serial form are combined in a VOTER circuit 74, the serial form output of which on lead 76 is fed in parallel through unidirectional line drivers 77, 78 and 79, which in turn drive the serial data bus 13. VOTER circuit 83 for feedback at the same time to the converters 68, 68a and 68b via lead 75 provides for serial data to be reconverted to parallel form when transmitted from the modules 12 back through the parallel interface circuits 66, 66a and 66b to the microprocessors 60, 60a and 60b.

These microprocessors 60, 60a and 60b together with their associated memories 62, 62a and 62b select the Doppler frequency response for each module according to FIG. 2 as well as the gating and trigger signals transmitted from terminal 15. Lines 67, 67a, and 67b provide triple module redundant lines for selection to put the multiplexer 16 in the proper order for processing outputs from filters 12. Voter 70 (2 out of 3) makes sure that interface control 72 receives a proper signal to convert into a signal on line 15 which multiplexer 16 can understand. Those gates and triggers may include other system functions in a radar system associated with the filterbank combination herein described. The synthetic test signals comprising discretely Doppler-modulated digitally coded video reaches each corresponding module through the redundant serial bus 13, the interface block 19, lead 49, and thence into the input of the corresponding module as described in connection with FIG. 2. The clock signals for controlling storage in 40 and the weighting control on lead 29 from the control block 41 in the module is also recognized according to discrete address for each corresponding module. The return signals passed from the modules via bus 13 and reaching the microprocessors via lead 75, through the converters 68, 68a and 68b and the parallel interface blocks 66, 66a and 66b, confirm to the microprocessors that the individual modules are performing correctly. The ungated I and Q filter video from each module (leads 36 and 37 into BIT register 46 and thence through lead 47, serial bus interface 19 and redundant bus 13 in each module) is compared in each microprocessor, PROM/RAM combinations such as 60 and 62 etc., to determine that the filtered digital video from each module is that which the controller has programmed into that corresponding module. Stated otherwise, this constitutes confirmation that the Doppler frequency response desired is being provided by each module, in response to the corresponding synthetic unfiltered signal on leads 49 and 21 in the module. In the event of failure of any module to pass this test at any time, the microprocessor and PROM/RAM combination such as 60 and 62 automatically selects a spare module and commands the weight PROM 34 in that module, through the signal chain from the controller to the module already described, to provide the frequency response formerly provided by the failed module. The required weights for each Doppler frequency "bin" intended are stored in the weight PROM 34 in the module and are selected in accordance with controller discretely addressed signals which appear on lead 29 in each module in service.

It will be understood from the foregoing description that a very large order of functional adaptability and fail-softness has been achieved in the system according to this description. Of course, modifications and variations on the specific digital circuitry will suggest themselves to those of skill in this art once the functional aspects of the combination are well understood. Accordingly, it is not intended that the invention be regarded as limited to the specific circuitry described or depicted in the drawings, the description and drawings being intended as typical and illustrative only.

What is claimed is:

1. An adaptive filterbank responsive to received Doppler-modulated digitized video signals, comprising:

a plurality of narrowband filter modules each having an I and Q section and each having a Doppler frequency response controllable by application of a set of digital weighting values, said modules including means for multiplying said video signals by said weighting values;

first means for storing a plurality of said weighting values each corresponding to a discrete Doppler response and for selecting and discretely applying said weighting values within corresponding ones of said filter modules;

second means for generating a plurality of simulated digitized video test signals each Doppler-modulated at a set of discrete frequencies corresponding to the intended response of one of said modules;

third means for alternating the input signal of each of said modules between said received video signals and the corresponding one of said second means simulated video test signals; and fourth means responsive to the output of each of said modules for continuously monitoring the Doppler frequency response thereof and for controlling the selection and application of corresponding ones of said weighting values to each of said modules.

2. A system according to claim 1 in which said modules have complex video signal input and processing capabilities.

3. A system according to claim 2 in which said simulated video test signals and said weighting values are in complex form and said modules include multipliers for complex multiplication of said video signals by said complex weighting values.

4. A system according to claim 3 in which said third means includes first multiplexing means for effecting said module input signal alternation and in which second multiplexing means are included in association with said multipliers whereby one of said multiplications produces the products (A)(I) on a given clock pulse and (B)(Q) on the following clock pulse and the other of said multipliers produces the products (B)(I) on said given clock pulse and (A)(Q) on said following clock pulse, where said video signals are of the form $(I+jQ)$ and said weighting values are of the form $(A+jB)$.

5. A system according to claim 4 further including an output multiplexer whereby the outputs of said modules are multiplexed in the time order in which the Doppler-modulated signals to which they respond occur in said received signals to produce a train of video signals characteristic of MTI radar systems.

6. A system according to claim 1 further including an output multiplexer whereby the outputs of said modules are multiplexed in the time order in which the Doppler-modulated signals to which they respond occur in said received signals to produce a train of video signals characteristic of MTI radar systems.

7. A system according to claim 6 in which a programmable weighting memory is included in each of said modules for storing discrete weighting values for all system Doppler responses and controller means are provided for controlling said weighting memory to select and apply weighting signals to said multipliers corresponding to a different Doppler frequency response for each of said modules.

8. A system according to claim 1 in which a programmable weighting memory is included in each of said modules for storing discrete weighting values for all system Doppler responses and controller means are provided for controlling said weighting memory to select and apply weighting signals to said multipliers corresponding to a different Doppler frequency response for each of said modules.

9. A system according to claim 8 in which said controller means is responsive to the complex video output of each of said modules for comparing said output with the corresponding synthetic test signal to identify malfunctions of any of said modules.

10. A system according to claim 9, in which said controller means is responsive to the indentification of malfunctions of any of the modules to replace such failed module with another of said modules or a spare module.

11. A system according to claim 9 in which a redundant serial bus comprising multiple, parallel-connected conductors is provided and in which serial-to-parallel and parallel-to-serial converters are provided within said controller and said modules for parallel digital operation therein.

12. A system according to claim 9 in which said controller comprises multiple microprocessor and associated memory units operating synchronously and in parallel with their output signals redundantly combined to provide fail-soft operation.

13. A system according to claim 12 in which a redundant serial bus comprising multiple, parallel-connected conductors is provided and in which serial-to-parallel and parallel-to-serial converters are provided within said controller and said modules for parallel digital operation therein.

14. A system according to claim 8 in which a redundant serial bus comprising multiple, parallel-connected conductors is provided and in which serial-to-parallel and parallel-to-serial converters are provided within said controller and said modules for parallel digital operation therein.

15. A system according to claim 14 further including an output multiplexer whereby the outputs of said modules are multiplexed in the time order in which the Doppler-modulated signals to which they respond occur in said received signals to produce a train of video signals characteristic of MTI radar systems.

* * * * *